United States Patent [19]

Hoppough

[11] 4,034,161

[45] July 5, 1977

[54] TELEPHONE RECEIVER-OFF-HOOK DETECTOR

[75] Inventor: Richard Scott Hoppough, Greensboro, N.C.

[73] Assignee: Bell Telephone Laboratories, Incorporated, Murray Hill, N.J.

[22] Filed: June 28, 1976

[21] Appl. No.: 700,329

[52] U.S. Cl. .................... 179/18 AB; 179/175.2 C; 324/51

[51] Int. Cl.² ......................................... H04M 3/22

[58] Field of Search ............... 179/18 AB, 175.2 C, 179/175.2 R, 175.24, 16 F; 324/51; 340/248 R, 253 H, 253 Y, 253 Z

[56] References Cited

UNITED STATES PATENTS 3,287,502  11/1966  Rohrig ........................... 179/18 AB Primary Examiner—Thomas A. Robinson
Attorney, Agent, or Firm—H. L. Logan

[57] ABSTRACT

A controlled-amplitude, alternating test signal at a central office is applied to a telephone subscriber's line. The nonlinear impedance vs. voltage characteristic of the subscriber's telephone in an off-hook state causes harmonics of the test signal to be generated. A harmonic so generated is detected at the central office, which indicates the presence of a receiver-off-hook telephone.

3 Claims, 3 Drawing Figures

TELEPHONE RECEIVER-OFF-HOOK DETECTOR

BACKGROUND OF THE INVENTION

1. Field of the Invention

This invention relates to determining, from a telephone central office, whether or not a subscriber telephone is in a receiver-off-hook condition.

2. Description of the Prior Art

A frequent telephone problem is where a first subscriber reports repeated busy signals when trying to reach a second subscriber. Assuming the first subscriber has dialed correctly, busy signals may be produced by a leakage path between the second subscriber's telephone line conductors or by the second subscriber's telephone being in a receiver-off-hook-and-in-use condition or in a receiver-off-hook-and-not-in-use condition.

Heretofore, it has been a common practice to identify the cause of the problem by an operator or craftsperson gaining access to the line in question and identifying the cause by what is heard on the line. This testing procedure requires what is considered to be an unreasonable length of time for testing, possible ambiguity with respect to the results produced and, furthermore, possible interference with a customer's conversation.

To improve telephone service, consideration has been given to automating this entire test procedure. With this in mind, the present inventor invented a receiver-off-hook-and-in-use detector which forms the subject matter of his copending application Ser. No. 700,293, filed on even date herewith. When this detector has determined that a receiver is not off-hook-and-in-use, tests must still be performed to determine if the problem is caused by either a receiver-off-hook-and-not-in-use condition or by a line leakage condition.

The two remaining conditions may be distinguished from one another by taking advantage of the nonlinear resistance versus voltage characteristic of a receiver-off-hook telephone and the substantially linear resistance versus voltage characteristic of a conductor-to-conductor leakage path. In particular, a plurality of dc impedance measurements, where each measurement is made at a higher voltage level than the prior measurement, are performed on the line. Substantially identical measurements indicate a conductor-to-conductor leakage path while unlike measurements indicate a receiver-off-hook condition.

Two shortcomings exist in the last-mentioned test. First, central office low resistance equipment and battery must be disconnected from the line under test. This requires the services of a technician. Secondly, the required testing time is much longer than, and therefore not commensurate with, the testing time required by the present inventor's previously mentioned receiver-off-hook-and-in-use detector.

SUMMARY OF THE INVENTION

An object of the present invention is to perform a test, from a telephone central office, on a subscriber line to determine if the subscriber's telephone is in a receiver-off-hook condition.

This and other objects of the invention are achieved by taking advantage of the nonlinear impedance vs. voltage characteristic presented by the average telephone when it is in a receiver-off-hook condition. In accordance with the invention, a controlled-amplitude, alternating test signal at a central office is applied to the subscriber's line. The nonlinear impedance vs. voltage characteristic of the subscriber's telephone in an off-hook state causes harmonics of the test signal to be generated. A harmonic so generated is detected at the central office, which indicates the presence of an off-hook telephone.

As staated above, the test signal is amplitude controlled. This is to accommodate the fact that subscriber lines differ in the loading presented to the test signal. A simplistic approach to overcome various degrees of loading is to use a test signal having an amplitude sufficient to assure the presence of a detectable harmonic signal. However, elements — such as loading coils — in the lesser loading situations may be driven to the point that they present nonlinear impedances which also generate harmonics. Under these conditions of operation, a receiver-off-hook condition may be indicated notwithstanding the fact that the receiver is not off-hook. This problem is overcome in accordance with the invention by measuring the loading effect of the line and then setting the test signal at a level appropriate for the loading effect.

DETAILED DESCRIPTION OF APPARATUS EMBODYING THE INVENTION

Figure 1:
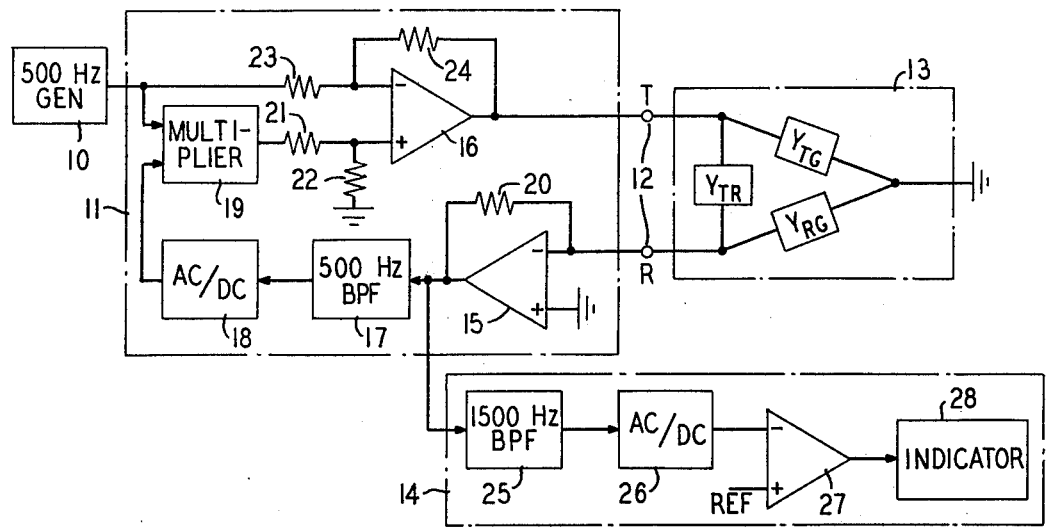
FIGS. 1, 2 and 3 show block diagrams of three apparatus embodying the present invention.

In FIG. 1, a 500 Hz alternating signal from a source 10 is applied by a level controlling circuit 11 to a telephone subscriber's tip and ring terminals 12. The subscriber's line connected to tip and ring terminals 12 and the telephone connected to the other extremities of the line are represented by a block 13. (Block 13 contains a typical admittance representation of such structure.) Level controlling circuit 11 automatically sets the level of the alternating signals applied to the subscriber's line based upon the loading effect of block 13. Finally, a detector circuit 14 indicates when a 1500 Hz signal above a predetermined level is present on the subscriber's line. Such a harmonically related signal is produced when block 13 has a nonlinear impedance appearance as a result of a telephone in a receiver-off-hook condition.

As stated earlier, subscriber lines differ in the loading presented to an alternating test signal. A simplistic approach to overcome various degrees of loading is to use a test signal having an amplitude sufficient to assure the presence of a detectable harmonic signal. However, elements — such as loading coils — in the lesser loading situations may be driven to the point that they present nonlinear impedances which also generate harmonics. Under these conditions of operation, a receiver-off-hook condition may be indicated notwithstanding the fact that the receiver is not off-hook. This problem is overcome in accordance with the invention by measuring the loading effect of the line and then setting the test signal at a level appropriate for the loading effect. This is accomplished by level controlling circuit 11.

Level controlling circuit 11 shown in FIG. 1 comprises two operational amplifiers 15 and 16, a 500 Hz bandpass filter 17, an ac-to-dc converter 18 and a multiplier 19. The inverting input terminal of amplifier 15 is connected to the ring terminal of tip and ring terminals 12 while the noninverting input of the amplifier is connected to ground. A feedback resistor 20 is connected between the inverting input and output terminal of amplifier 15. Amplifier 15 functions to cause the ring terminal to be at substantially ground potential while its output is a measure of the current flowing into and out of the ring terminal.

The 500 Hz component in the output of amplifier 15 is passed by filter 17 and converted to a dc potential by converter 18. This dc potential and the alternating signal of generator 10 are multiplied together in multiplier 19 and applied by way of a voltage divider, comprising resistors 21 and 22, to the noninverting input terminal of amplifier 16. The alternating signal from generator 10 is also applied through a resistor 23 to the inverting input terminal of amplifier 16. A feedback resistor 24 is connected between the output and inverting input terminals of amplifier 16. Resistors 21, 22, 23 and 24 are all substantially equal to one another. The difference output of amplifier 16 is applied to the tip terminal of tip and ring terminals 12.

In operation the 500 Hz signal present in the output of amplifier 15 is related to the loading effect of the structure represented by block 13. This controls the amplitude of the output of generator 10 applied to the noninverting terminal of amplifier 16 which, in turn, controls the amplitude of the 500 Hz signal between the tip terminal and ground. Amplifier 15, however, forces the ring terminal to be at substantially ground potential. As a consequence of these cooperative actions the application of the 500 Hz signal applied between tip and ring terminals 12 is controlled to a level related to the loading effect of block 13.

The output of amplifier 15 is also applied to detector circuit 14 which comprises a 1500 Hz bandpass filter 25, an ac-to-dc converter 26, a comparator 27 and an indicator 28. When a 1500 Hz component is present in the output of amplifier 15 it is passed by filter 25 and converted to a dc potential by converter 26. The level of this dc potential is compared to a reference potential by comparator 27. When the dc potential is greater than the reference potential, indicator 28 produces an output.

When the telephone in block 13 is in a receiver-on-hook state, block 13 does not have a nonlinear impedance which results in the production of a third harmonic (1500 Hz) signal sufficient to activate indicator 28. When, on the other hand, the telephone is in a receiver-off-hook state, then the nonlinear impedance presented thereby causes a detectable third harmonic signal to be generated and appropriate action may be started to have the receiver replaced on hook.

Figure 2:
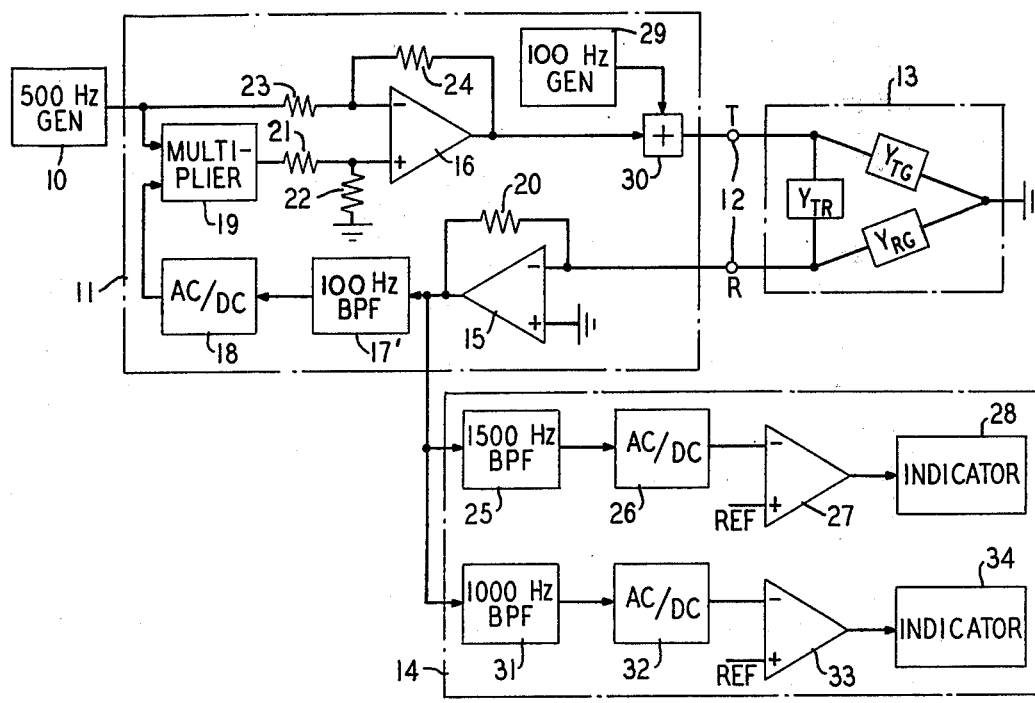

The invention is also embodied in the apparatus shown in FIG. 2, which apparatus is similar to that of FIG. 1 and consequently identical elements thereof have been assigned the same symbols as used in FIG. 1. The apparatus of FIG. 2 differs from that of FIG. 1 in two respects. First, a second signal at a frequency of 100 Hz is used for setting the first signal level. The use of a second signal for amplitude controlling the first signal forms the subject matter claimed in copending application Ser. No. 700,330 filed on even date herewith by J. T. Holt. In particular, the output of a 100 Hz generator 29 is also applied to tip and ring terminals 12 by way of a summing circuit 30 and filter 17 of FIG. 1 has been replaced by 100 Hz bandpass filter 17'. The use of a second signal permits the level of the first signal to be more closely controlled so that substantially only the level necessary to detect an off-hook condition is applied to the tip and ring terminals.

The second difference in the apparatus of FIG. 2 is that detector circuit 14 has been expanded to also indicate the presence of a second harmonic signal in excess of a predetermined level. In particular, a 1000 Hz bandpass fliter, an ac-to-dc converter 32, a comparator 33 and an indicator 34 have been added. Detection of the second harmonic is sometimes desirable when this harmonic is the predominant one in a receiver-off-hook condition.

Figure 3:
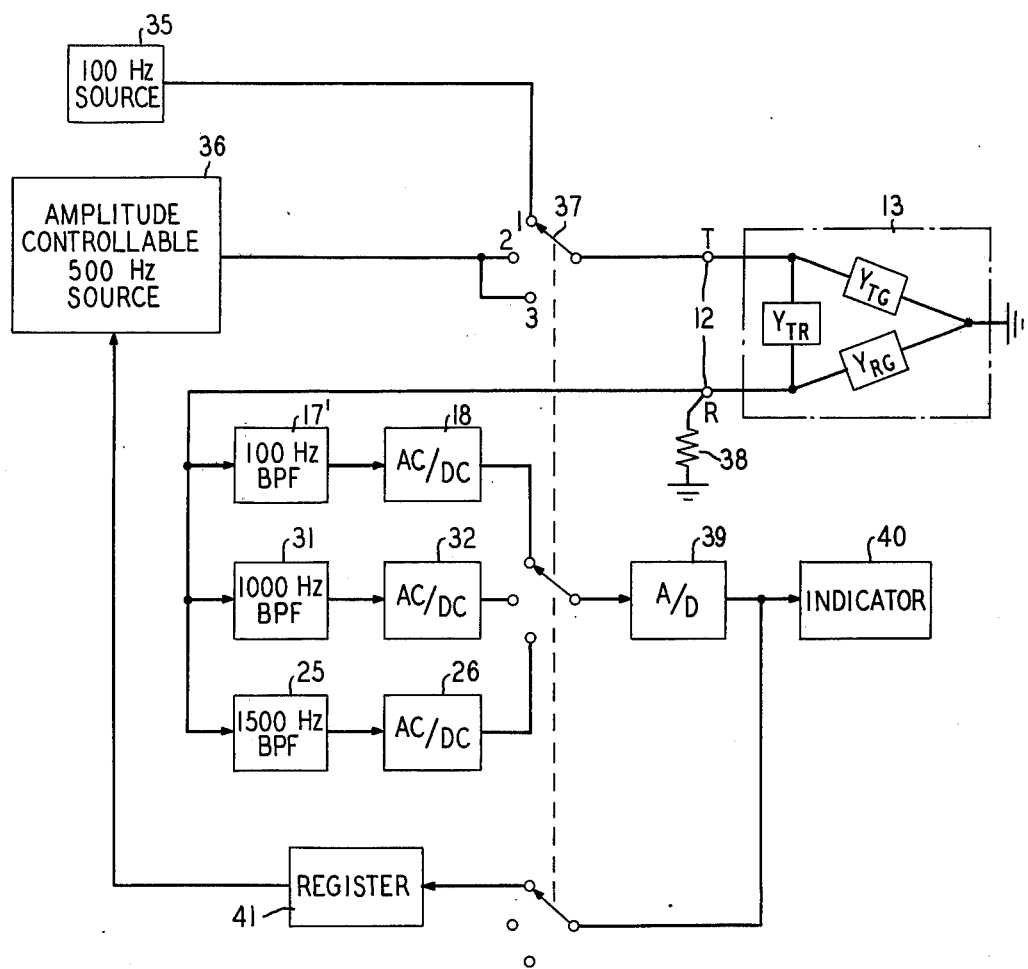

The invention may be embodied in still other forms as demonstrated, for example, by the apparatus shown in FIG. 3. The apparatus of FIG. 3 includes a first source 35 for producing a substantially constant amplitude 100 Hz signal and a second source 36 for producing a 500 Hz signal at any one of a plurality of levels as taught in the aforementioned Holt application. Sources 35 and 36 are connected to a 3-pole, 3-position switch 37 which in turn is connected to the tip terminal of terminals 12. When switch 37 is in its first position, source 35 is connected to the tip terminal; when the switch is in its second and third positions, source 36 is connected to the tip terminal. The ring terminal of terminals 12 is returned to ground by way of resistor 38. Whatever current flows through the line also flows through resistor 38 and develops a signal which in turn is applied in parallel to bandpass filters 17', 31 and 25. The outputs of these filters are applied to ac-to-dc converters 18, 32 and 26, respectively. These filters and converters are the same as those used in the apparatus of FIG. 2 and consequently have been assigned the same symbols.

Converters 18, 32 and 26 are in turn connected to switch 37 which selects an output from one of the converters and applies it to an analog-to-digital converter 39. The output of converter 39 is applied to both an indicator 40 and the third pole of switch 37. In the first switch position, any 100 Hz signal developed across resistor 38 is passed through filter 17' converted to a digital form and applied to a register 41. In addition to storing the output of converter 39, register 41 applies a controlled input to source 36 to set the amplitude of the 500 Hz output from source 36.

In operation, switch 37 is first placed in its first position so that a 100 Hz signal is applied between the tip terminal and ground. The current path for this signal is through resistor 38 to ground. The signal developed across resistor 38 is passed by filter 17', converted to a dc signal by converter 18 and further converted into a digital signal by converter 39. This digital signal, which is an indication of the loading effect of the telephone line represented by block 13, is applied to and stored by register 41. The output of register 41 sets the output of source 36 to an amplitude level which is sufficient to test the telephone line but is not so great as to overdrive the line element to produce undesired harmonics.

Switch 37 is next placed in position 2 or 3 depending on known characteristics of the line under test. In either of these positions the 500 Hz signal from source 36 is applied between the tip terminal and ground. In position 2 any second harmonic signal developed across resistor 38 results in an indication by indicator 40, while in position 3 any third harmonic signal developed across resistor 38 results in an indication by indicator 40. Such indications are indicative of receiver-off-hook telephones while the absence of any indications is indicative of a receiver not being off hook.

What is claimed is:

1. Apparatus for detecting a telephone receiver-off-hook condition from a location remote from the telephone but interconnected therewith by a transmission line, said apparatus comprising:
   a source of alternating signals,
   means for use at said location for applying to said transmission line said signals set to an amplitude level related to the loading effect of said transmission line, and
   means for use at said location for producing an output when a signal having a frequency harmonically related to the frequency of said alternating signal and exceeding a predetermined amplitude is present on said line.

2. Apparatus for detecting a telephone receiver-off-hook condition from a location remote from the telephone but interconnected therewith by a transmission line, said apparatus comprising:
   a souce of alternating signals,
   means for use at said location for measuring the loading effect of said transmission line, for amplitude-controlling, said alternating signals in response thereto and for applying said amplitude-controlled signal to said line, and
   means for use at said location for producing an output when a signal having a frequency harmonically related to the frequency of said alternating signal and exceeding a predetermined amplitude is present on said line.

3. A method for detecting a telephone receiver-off-hook condition from a location remote from the telephone but interconnected therewith by a transmission line, said method comprising the steps of:
   applying to said transmission line, at said location, alternating signals set to an amplitude level based on the loading effect of said transmission line, and
   detecting, at said location, the presence on said line of a signal having a frequency harmonically related to the frequency of said alternating signal and exceeding a predetermined amplitude.

* * * * *